(12) United States Patent
Haller

(10) Patent No.: US 9,085,245 B2
(45) Date of Patent: Jul. 21, 2015

(54) COMMERCIAL VEHICLE SEAT COMPRISING A DOUBLE-CATCH CROSS SLIDE PART

(71) Applicant: GRAMMER AG, Amberg (DE)

(72) Inventor: Erwin Haller, Birgland (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 14/109,226

(22) Filed: Dec. 17, 2013

(65) Prior Publication Data

US 2014/0167468 A1    Jun. 19, 2014

(30) Foreign Application Priority Data

Dec. 18, 2012  (DE) .................. 10 2012 112 525

(51) Int. Cl.
| | |
|---|---|
| *B60N 2/06* | (2006.01) |
| *B60N 2/08* | (2006.01) |
| *B60N 2/14* | (2006.01) |
| *B60N 2/16* | (2006.01) |
| *B60N 2/015* | (2006.01) |
| *B60N 2/50* | (2006.01) |

(52) U.S. Cl.
CPC *B60N 2/015* (2013.01); *B60N 2/06* (2013.01); *B60N 2/062* (2013.01); *B60N 2/085* (2013.01); *B60N 2/0825* (2013.01); *B60N 2/14* (2013.01); *B60N 2/508* (2013.01); *B60N 2/509* (2013.01)

(58) Field of Classification Search
CPC ........... B60N 2/14; B60N 2/146; B60N 2/502
USPC ..................................... 297/344.24
See application file for complete search history.

(56) References Cited

U.S. PATENT DOCUMENTS

| | | | |
|---|---|---|---|
| 4,344,597 A |   | 8/1982 | Eimen |
| 4,570,997 A | * | 2/1986 | Tanizaki et al. .......... 297/344.24 |

(Continued)

FOREIGN PATENT DOCUMENTS

| | | |
|---|---|---|
| DE | 1505481 | 8/1969 |
| DE | 1630556 | 6/1971 |

(Continued)

OTHER PUBLICATIONS

Official Action (no English translation available) for German Patent Application No. 102012112525.2 dated Sep. 3, 2013, 3 pages.

*Primary Examiner* — Rodney B White
(74) *Attorney, Agent, or Firm* — Sheridan Ross P.C.

(57) ABSTRACT

A commercial vehicle seat is provided including a seat part, a backrest part and a seat substructure for arrangement on a body part of a commercial vehicle, in which the seat substructure includes a transverse oscillation device comprising a cross slide part which is capable of oscillating transversely to the length of the commercial vehicle and by means of which at least the seat part is mounted so as to be capable of oscillating transversely to the direction of travel on a base carrier part of the seat substructure, and includes a locking device for fixing the cross slide part on the base carrier part, wherein the locking device includes two locking units which are spaced apart along the length of the commercial vehicle and have respective locking elements which are mounted pivotally about vertical pivot axes or displaceably along linear axes and are arranged so as to be synchronously operable in a horizontal plane between two transverse rail units of the transverse oscillation device.

11 Claims, 5 Drawing Sheets

(56) References Cited

U.S. PATENT DOCUMENTS

| | | | |
|---|---|---|---|
| 4,834,452 A * | 5/1989 | Goodrich | 297/344.24 X |
| 5,161,765 A * | 11/1992 | Wilson | 297/344.24 X |
| 5,292,179 A * | 3/1994 | Forget | 297/344.24 |
| 5,704,729 A * | 1/1998 | Carnahan et al. | 297/344.24 X |
| 5,720,462 A * | 2/1998 | Brodersen | 297/344.24 X |
| 6,079,786 A * | 6/2000 | Kirkland et al. | 297/344.24 |
| 6,325,456 B1 * | 12/2001 | Carnahan | 297/344.24 |
| 6,402,114 B1 * | 6/2002 | Carnahan et al. | 297/344.24 X |
| 7,121,608 B2 * | 10/2006 | Billger et al. | 297/344.24 X |
| 7,520,567 B2 * | 4/2009 | Billger et al. | 297/344.24 X |
| 7,845,703 B2 * | 12/2010 | Panzarella et al. | 297/344.24 X |
| 8,033,589 B2 * | 10/2011 | Kusanagi et al. | 297/344.24 X |
| 2002/0149250 A1 * | 10/2002 | Silvia | 297/344.24 |
| 2003/0189370 A1 * | 10/2003 | Hemmer et al. | 297/344.24 X |
| 2006/0226685 A1 * | 10/2006 | Priepke et al. | 297/344.24 |
| 2009/0284061 A1 * | 11/2009 | Maier et al. | 297/344.24 |
| 2011/0074198 A1 * | 3/2011 | Iwasaki et al. | 297/344.24 |
| 2015/0015039 A1 * | 1/2015 | Brand et al. | 297/344.24 X |
| 2015/0035334 A1 * | 2/2015 | Roth et al. | 297/344.24 |

FOREIGN PATENT DOCUMENTS

| | | |
|---|---|---|
| DE | 3218379 | 11/1983 |
| DE | 102005028725 | 1/2006 |

* cited by examiner

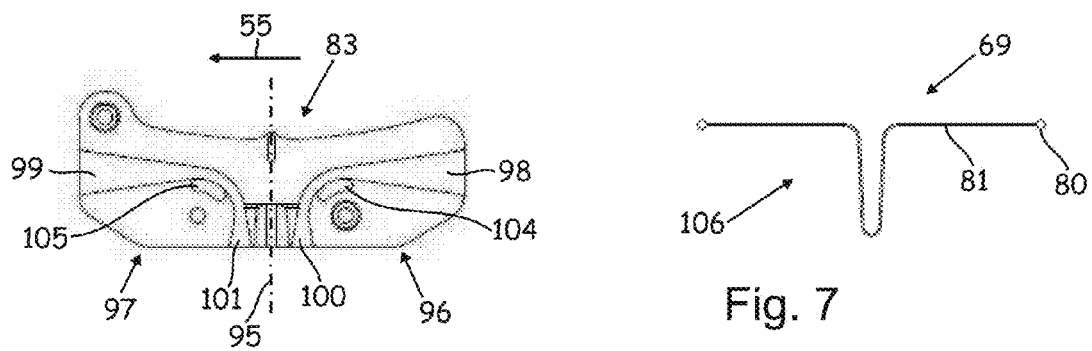
Fig. 6
Fig. 7
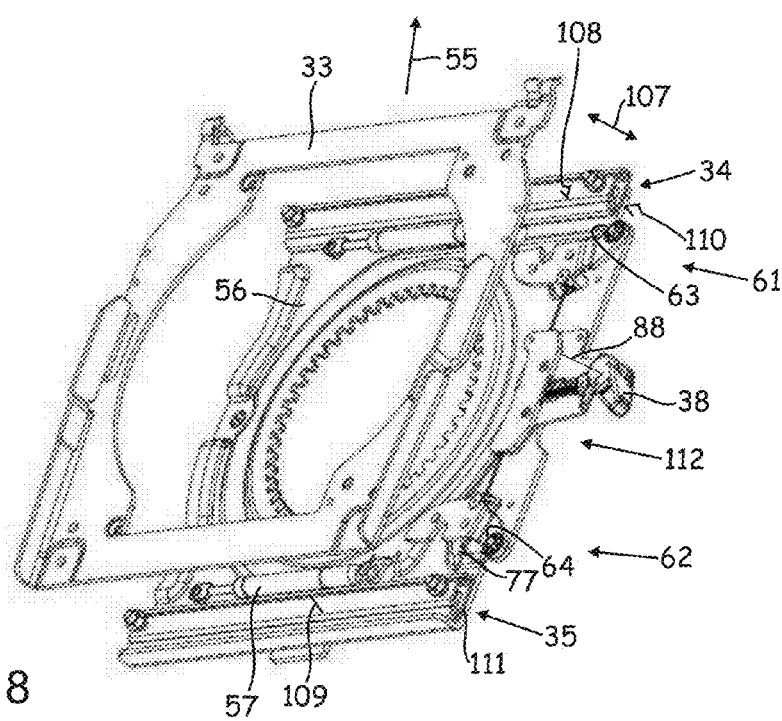
Fig. 8
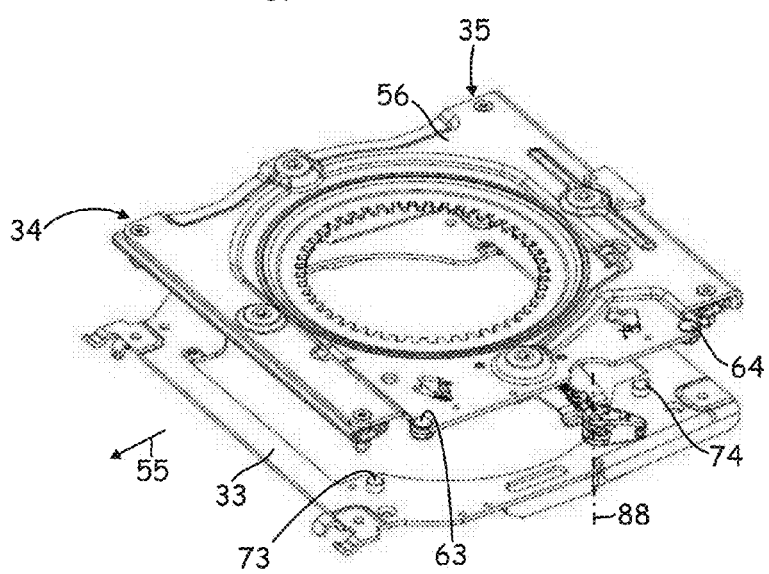
Fig. 9

COMMERCIAL VEHICLE SEAT COMPRISING A DOUBLE-CATCH CROSS SLIDE PART

CROSS-REFERENCE TO RELATED APPLICATIONS

This application claims the benefit of German Application No. 10 2012 112 525.2 filed Dec. 18, 2012, the disclosure of which is incorporated herein by reference.

The invention relates to a commercial vehicle seat comprising a seat part, a backrest part and a seat substructure for arrangement on a body part of a commercial vehicle, in which the seat substructure includes a transverse oscillation device comprising a cross slide part which is capable of oscillating transversely to the length of the commercial vehicle and by means of which at least the seat part is mounted so as to be capable of oscillating transversely to the direction of travel on a base carrier part of the seat substructure, and includes a locking device for fixing the cross slide part on the base carrier part.

Generic commercial vehicle seats are already known from the prior art, of which the aim is to improve the comfort of a seated passenger on difficult terrain by using a transversely oscillating cross slide part. However, this oscillation should not be activated continuously, as it may also be obstructive, for example in normal road traffic, say when travelling round bends at considerable speed or the like, when the passenger needs to be held in a stabilising manner by the commercial vehicle seat. In this respect, corresponding locking devices for fixing the cross slide part on a stationary component of a seat substructure for the commercial vehicle seat are known. In this case, the locking means is usually integrated in the rails, in or on cross slide parts of a transverse oscillation device, by means of which the cross slide part is guided on the stationary component. However, a major problem here is that, owing to the play that is required for technical reasons between a glide rail element and a guide rail element of the transverse rails, a critical degree of rotational freedom often occurs about a vertical axis, and consequently a sensation, albeit subjective, of play, whereby the commercial vehicle seat rocks about the vertical axis. In these arrangements, corresponding pawls of the locking devices are coupled via relatively large lever arms or via wire linkages, a number of hinge joints being required between the individual components. A drawback of these known solutions is that they are correspondingly bulky, and also often require heavy maintenance on account of the large number of moving components. The large number of mutually coupled components also causes undesirable play in the entire locking device.

It is an object of the present invention to develop generic commercial vehicle seats in such a way that at least the aforementioned drawbacks are overcome.

The object of the invention is achieved by a commercial vehicle seat comprising a seat part, a backrest part and a seat substructure for arrangement on a body part of a commercial vehicle, in which the seat substructure includes a transverse oscillation device comprising a cross slide part which is capable of oscillating transversely to the length of the commercial vehicle and by means of which at least the seat part is mounted so as to be capable of oscillating transversely to the direction of travel, on a base carrier part of the seat substructure, and includes a locking device for fixing the cross slide part on the base carrier part, the locking device comprising two locking units, which are spaced apart along the length of the commercial vehicle and have respective locking elements, which are mounted pivotally about vertical pivot axes or displaceably along linear axes, the locking units being arranged so as to be synchronously operable in a horizontal plane between two transverse rail units of the transverse oscillation device.

The proposed locking device makes it possible to integrate the locking units, required for fixing the cross slide part, into the seat substructure of the commercial vehicle seat in a constructionally simple and also very compact manner.

The present cross slide part is a laterally horizontally displaceable horizontal cross slide part, with the result that, in particular, the seat part of the commercial vehicle seat is laterally horizontally displaceable. In this respect, the invention accordingly also relates to a laterally horizontally displaceable commercial vehicle seat.

Since the locking elements of the two locking units are spaced apart in a horizontal plane, extremely good play-free fixing of the oscillatory cross slide part is achieved, the locking elements each being able to pivot about a vertical pivot axis for locking and unlocking, and thus being able to be integrated, in a particularly planar construction, into the seat substructure. As a result a locking device capable of withstanding particularly heavy loads can be produced. Additionally, the overall seat height of the present commercial vehicle seat can also be further reduced, more freedom of movement for a passenger or more space for other components of the commercial vehicle seat being available on the seat substructure.

In this respect, the present locking device within the meaning of the invention is a double-catch device with a double-catch cross slide part.

In this connection it is also extremely advantageous that, in particular, the locking elements are arranged between two transverse rail units of the transverse oscillation device, so the entire space is optimally used to reduce the overall height of the seat substructure. In particular it is advantageous that specifically the locking elements are not integrated in the transverse rail units, so these units can be simpler and more planar in construction.

Ideally each of the two locking elements is mounted about a vertical pivot axis, and this allows easier operation. In addition, the required dimensions can be kept to a minimum in this arrangement if the vertical pivot axes of the two locking elements are arranged together in a vertical plane extending in the lengthwise direction of the vehicle. Furthermore, the entire locking device can thus be symmetrical in construction, and this specifically greatly simplifies the coupling of the locking elements.

The two locking elements are thus configured as pivot hook plate elements so they are accordingly planar in height, for example with a main body height of less than 10 mm or 5 mm.

The design of the seat substructure can be further substantially simplified if each of the locking elements is coupled to the cross slide part by means of a resiliently deflectable operating element which transmits only tensile operating forces. As a result, each operating element can be deflected even in the tightest space without any hinge joints.

Since the operating element can only be subjected to tension, it can be of lightweight construction. Within the meaning of the invention, the term "transmits only tensile operating forces" means that the operating element can absorb and transmit only negligible compressive and shearing forces, if any.

It will be appreciated that, for moving the respective locking element, for example from a locking position and into an unlocking position, the operating element in question can have various configurations.

In a particularly preferred variant, the two locking elements are operatively interconnected by a single continuous Bowden cable element which is deflected around a deflecting element of a manual operating handle. Owing to this Bowden cable element, the locking device can be extremely simple in construction and can be accommodated compactly in the seat substructure and, in particular, between the two transverse rail units.

Contact-based guidance of the Bowden cable element is only required in the regions of a deflection in this arrangement. Otherwise it can be guided without contact even over prolonged distances. Owing to a reduction in the frictional surface in this arrangement, the locking device can also be operated more smoothly. A further reduction in weight can also be achieved, in addition to a reduction in components.

It is advantageous in this respect if the locking device includes a corresponding Bowden cable deflecting element, by means of which a single Bowden cable element is repeatedly deflected, starting from a first of the locking elements to a further one of the locking elements, by means of a deflecting element of a manual operating handle.

The locking device can have an even more compact, in particular even more planar, construction, if the locking elements, a resiliently deflectable operating element which is operatively connected to these locking elements, deflecting elements of a deflecting device and a manual operating handle are arranged in a common horizontal plane.

Ideally this as well as the locking elements, the resiliently deflectable operating element operatively connected to these locking elements and at least some of the deflecting elements of the deflecting device, such as the deflecting element of the manual operating handle move in and along this common horizontal plane or at least parallel thereto during operation of the manual operating handle.

The overall height of the seat substructure can be further reduced if the locking elements are arranged on the cross slide part, between two transverse rail units of the transverse oscillation device, in such a way that the height thereof is arranged in a space limited by a lower imaginary horizontal plane extending from the undersides of the spaced-apart transverse rail units and by an upper imaginary horizontal plane extending from the upper sides of the spaced-apart transverse rail units.

The reliability of the present locking device can be improved if a resiliently deflectable operating element which transmits only tensile operating forces is spring-biased. As a result the operating element is always under tension and can therefore be operated continually without play. A spring element of the type in question can readily be embodied, for example, by a helical spring element.

It has proven particularly advantageous if this operating element which transmits tensile forces is biased by a spring-biased deflecting element of a manual operating handle. It can thus be ensured, on the one hand, that the manual operating handle is invariably fixed in a good position on an actuating bracket. On the other hand, it is unnecessary to use further components.

In addition, it is also advantageous if each of the locking elements is arranged to act under spring bias in the direction of a locking position on the cross slide part. Very reliable locking can be ensured in this way, even if the commercial vehicle seat and, in particular, the locking device are subjected to relatively great impacts as a result of the travel situation. A corresponding spring element can be integrated into the mechanics in a particularly planar construction if a torsion spring element or a spiral spring of planar construction is used.

Ideally the biasing forces which keep the locking elements biased exceed the biasing forces which tighten the operating element, so the locking elements are invariably held automatically in the respective locking positions.

In an advantageous variant, moreover, the locking elements each have a planar main body on which is provided a recess for engaging with a locking bolt element of the locking device, the recess being arranged on a long side of the main body which is remote from a coupled side of the main body, defined by the operating element.

Ideally the locking elements are each coupled by the operating element in such a way that they are mounted on the cross slide part so as to pivot towards one another in order to unlock the locking device.

The long sides of the locking element are preferably selected for implementing the recess and a coupling point for fixing the operating element on the respective locking elements, as better leverage with respect to the respective vertical pivot axes can be achieved, though this does not necessarily mean that a short side of the locking element cannot also be used in a specific application.

While the locking elements are configured as pivot hook elements, it is accordingly advantageous if each of the locking units is allocated a locking bolt element, which is arranged on the base carrier part.

It can be ensured by means of a locking device of this configuration that the actual locking components, such as the locking elements and the corresponding locking bolt elements, are arranged to act directly on the cross slide part or on the base carrier part, with the result that extremely robust locking can be achieved.

Further advantages, aims and properties of the present invention will be described by means of the accompanying drawings and the following description, in which a commercial vehicle seat comprising two locking units of a locking device, arranged between two transverse rail units, is illustrated and described by way of example. In the drawings:

FIG. 6 is a schematic view of a deflecting device for a Bowden cable element of the present locking device;

FIG. 7 is a schematic view of a course of the Bowden cable element of the present locking device in its installed shape;

FIG. 8 is a schematic perspective view, from below, of a base carrier part and the locking elements of the present locking device, arranged on the cross slide part shown behind them;

FIG. 9 is a schematic perspective view, from above, of the cross slide part and the locking bolt elements of the present locking device, arranged on the base carrier part behind them;

Figure 1:
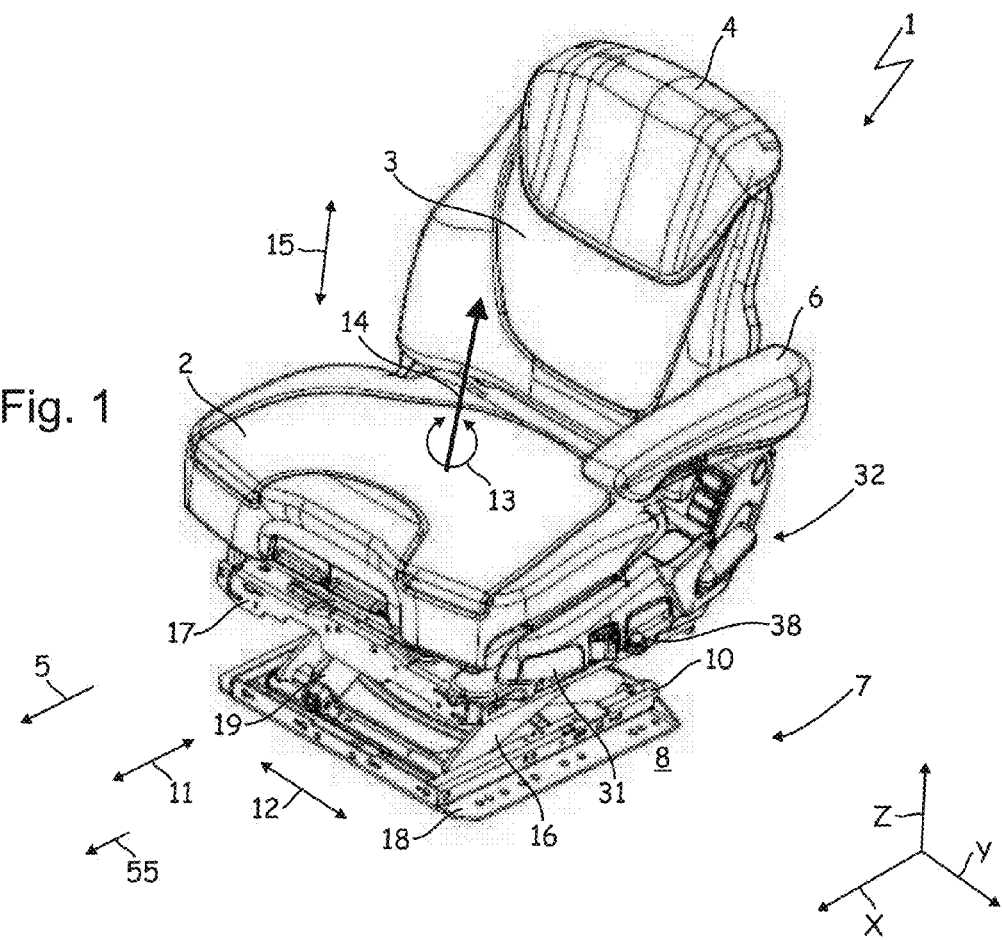
FIG. 1 is a schematic perspective view of a commercial vehicle seat comprising a seat substructure which includes a horizontal movement device and a transverse oscillation device and a locking device therefor.

The commercial vehicle seat 1 shown in FIG. 1 comprises a seat part 2 for a passenger to sit on and a backrest part 3 to support the passenger's back. In this embodiment, the backrest part 3 is equipped with a headrest part 4. An armrest part 6 is additionally also fastened to the right-hand side of the backrest part 3, as viewed in the forwards direction of travel 5. Furthermore, the commercial vehicle seat 1 also includes a seat substructure 7, by means of which the commercial vehicle seat 1 is fastened in its entirety to a body part 8, such as a cab floor of a commercial vehicle cab.

In order to be able to adapt the commercial vehicle seat 1 diversely to a wide variety of passenger requirements and also to be able to offer the best possible seating comfort, the seat substructure 7 in this embodiment comprises a horizontal movement device 9 and vertical movement device 10.

At least the seat part 2 and components connected thereto, such as the backrest part 3, can be moved by translation in lengthwise adjustment directions 11 (x axis) and transverse oscillation directions 12 (y axis) and also rotational adjustment directions 13 about a vertical axis 14 (z axis) as described in the following. The horizontal movement device 9 in this embodiment has a very small overall height of only 57 mm owing to its compact construction.

At least the seat part 2 and components connected thereto, such as the backrest part 3, can be moved by translation in vertical adjustment directions 15 with respect to the vertical axis 14 by means of the vertical movement device 10. For this purpose the vertical movement device 10 comprises a scissor-action frame 16, which is arranged between an upper plate 17 carrying the horizontal movement device 9, the vertical movement device 10 and a floor plate 18 of the vertical movement device 10, in such a way that the horizontal movement device 9 is mounted vertically movably relative to the floor plate 18. Furthermore the vertical movement device 10 also comprises a spring damper device 19 for cushioning and damping a vertical movement on the commercial vehicle seat 1 in a vertical direction 15.

Figure 2:
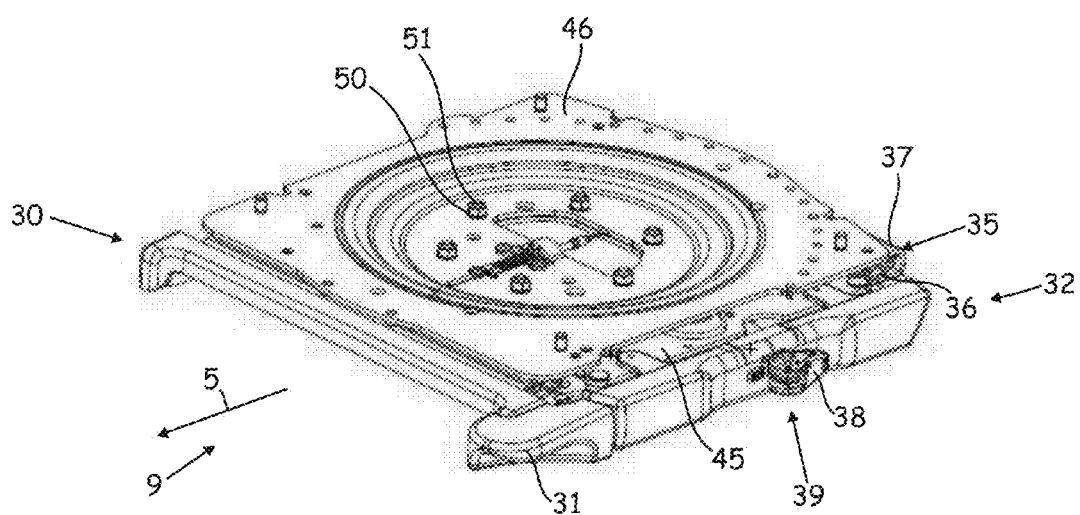
FIG. 2 is a schematic perspective view of the horizontal movement device of the seat substructure of the commercial vehicle seat from FIG. 1.
Figure 3:
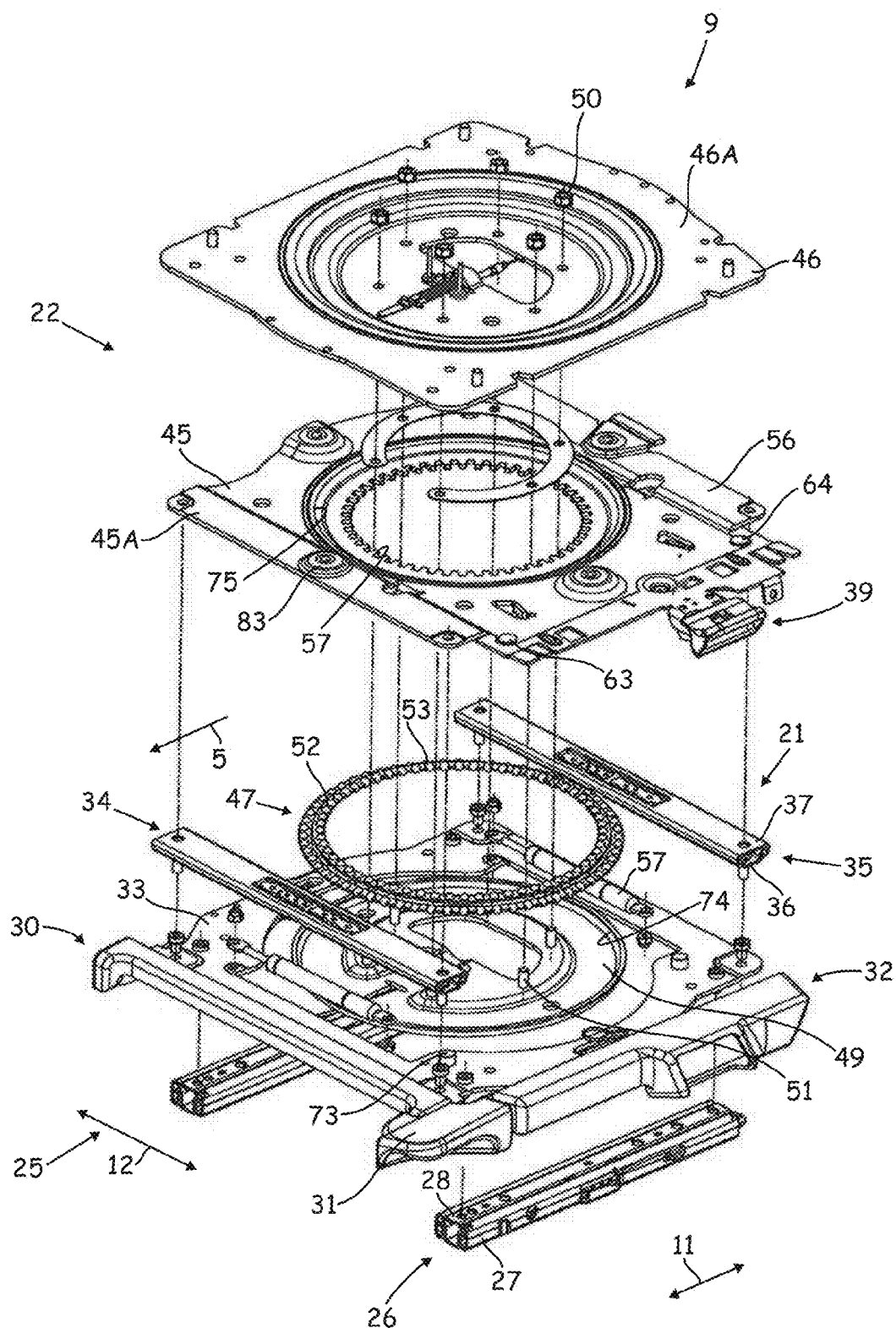
FIG. 3 is a schematic exploded view of the horizontal movement device from FIGS. 1 and 2.

The horizontal movement device 9 shown in greater detail in FIGS. 2 and 3 includes a lengthwise adjustment device 20, a transverse oscillation device 21 and a rotational adjustment device 22, in order to be able to move and set the commercial vehicle seat 1 within the meaning of the aforementioned lengthwise adjustment directions 11, transverse oscillation directions 12 and rotational adjustment directions 13. In another, no less advantageous, embodiment, the horizontal movement device 9 can also have only one of the adjustment or oscillation directions 20, 21 and 22 or any other combination thereof.

A front lengthwise adjustment distance of 120 mm and a back lengthwise adjustment distance of 90 mm from a neutral lengthwise position can be achieved by means of the lengthwise adjustment device 20, whereas a transverse oscillation distance about a neutral transverse position of +/−25 mm can be achieved by means of the transverse oscillation device 21. A pivoting movement of 60° about a neutral rotational position and/or a 180° rotation can each be achieved about the vertical axis 14 in 7.5° increments by means of the rotational adjustment device 22.

The lengthwise adjustment device 20 basically includes a right-hand lengthwise rail unit 25 and a left-hand lengthwise rail unit 26 (see FIG. 3), each of the lengthwise rail units 25, 26 including a guide rail element 27 (numbered merely by way of example) and a glide rail element 28 (also numbered merely by way of example). The guide rail element 27 in this arrangement is screwed on the upper plate 17 of the vertical movement device 10, and therefore above the vertical movement device 10, between it and the seat part 2.

In addition, the lengthwise adjustment device 20 in this embodiment is further allocated a double catch unit 30 by means of which the respective glide rail element 28 can be locked on or unlocked from the corresponding guide rail element 27 so the commercial vehicle seat 1 can be fixed or moved in the lengthwise adjustment direction 11.

To enable the passenger to manually operate the double-catch unit 30, the lengthwise adjustment device 11 further includes a manual grip element 31, which is integrated laterally beside the seat part 2 in an operating bracket 32 of the commercial vehicle seat 1.

The glide rail elements 28 of the lengthwise rail units 25 and 26, the double-catch unit 30 and also the manual grip element 31 with its mechanics are fastened on a base carrier part 33 of the horizontal movement device 9, on which transverse rail units 34 and 35 of the transverse oscillation device 21 are also fastened. Each of the transverse rail units 34 and 35 comprises a guide rail transverse element 36 and a glide rail transverse element 37, to allow a movement in the lateral adjustment direction 12.

In this embodiment, the lengthwise adjustment device 20 is arranged below the transverse oscillation device 21, so the former is placed between the transverse adjustment device 21 and the vertical movement device 10.

The respective guide rail transverse element 36 is thus screwed to the base carrier part 33 while the glide rail transverse element 37 accordingly guided on the guide rail transverse element 36 is arranged on a lower shell part 45 in each case.

In this embodiment, the lower shell part 45 belongs to the rotational adjustment device 22 and, with a correspondingly shaped two-layered upper shell part 46, forms a bearing for a rolling bearing unit 47, which is embodied by a ball bearing unit in this embodiment. On its underside the ball-bearing unit 47 is completed and protected by a cover element 49 which forms the second portion of the two-layered upper shell part 46 and spans the lower shell part 45, the upper shell part 46 and therefore also the ball-bearing unit 47 of the rotational adjustment device 22. For this purpose screw nuts 50 are screwed to corresponding threaded bolts 51 of the cover element 49.

Furthermore the lower shell part 45 forms a shell fixed part 45A of the rotational adjustment device 22 for rotation therewith, which is integrated in the seat substructure 7 for rotation therewith, while the present two-layered upper shell part 46 accordingly formulates a shell rotational part 46A which is rotatable relative to the shell fixed part 45A and is mounted rotatably about the vertical axis 14 on the shell fixed part 45A by means of the cover element 49 using two ball-and-cage parts 52 and 53 of the ball-bearing unit 47.

To enable at least the seat part 2 of the present commercial vehicle seat 1 to be able to oscillate transversely to the direction of travel 5 and therefore in particular also transversely to the length 55 of the commercial vehicle, the transverse oscillation device 21 is further characterised by a cross slide part 56 which is capable of oscillating transversely to the length of the commercial vehicle 55 and of which the oscillations can be further damped by dampers 57. This cross slide part 56 is accordingly guided relative to the base carrier part 33 by the two spaced-apart transverse rail units 34 and 35.

In addition the commercial vehicle seat 1 further comprises a locking device 60, which is shown in greater detail in FIGS. 4 to 11 and by means of which the cross slide part 56 can be fixed directly on the base carrier part 33, should an oscillation function not be desired.

According to the invention, the locking device 60 additionally shown in greater detail in FIGS. 4 to 11 for fixing or for releasing the transverse oscillation device 21 possesses two locking units 61 and 62 which are spaced apart along the length 55 of the commercial vehicle and each comprise a locking element 65 or 66 which is mounted pivotally about a vertical pivot axis 63 or 64.

These locking elements 65 or 66 are configured as lever elements, as described in greater detail in the following.

Figure 4:
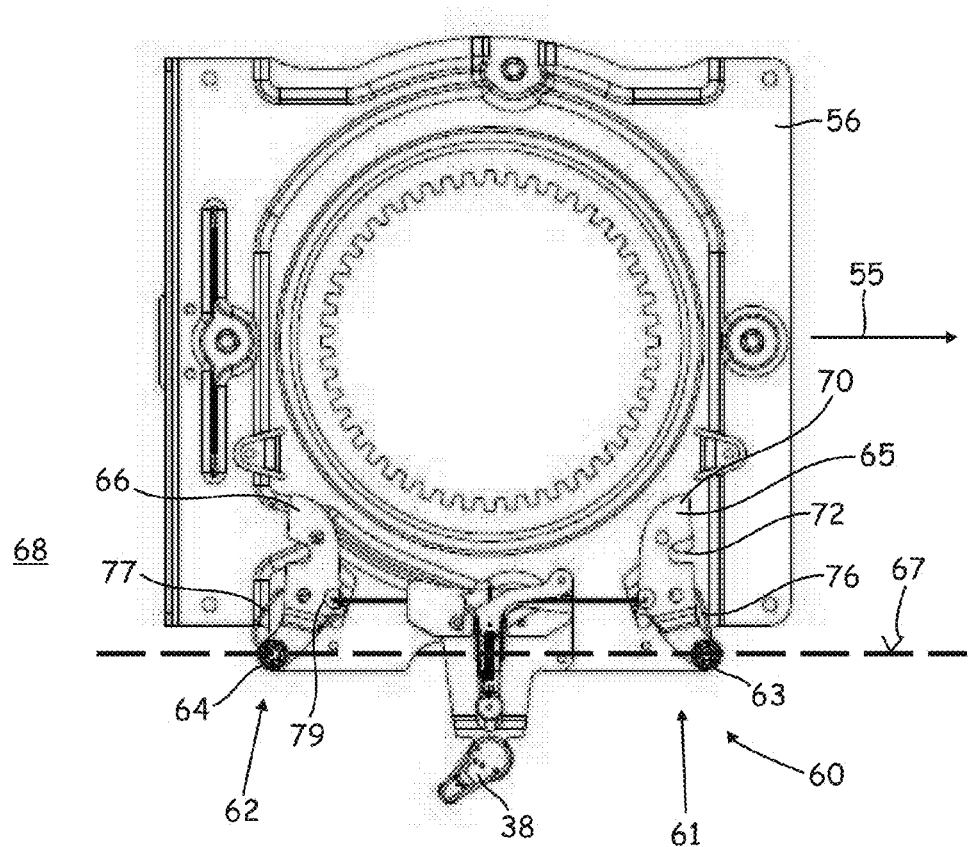
FIG. 4 is a schematic view from below of the locking device arranged on a cross slide part of the horizontal movement device from FIGS. 1 to 3.
Figure 5:
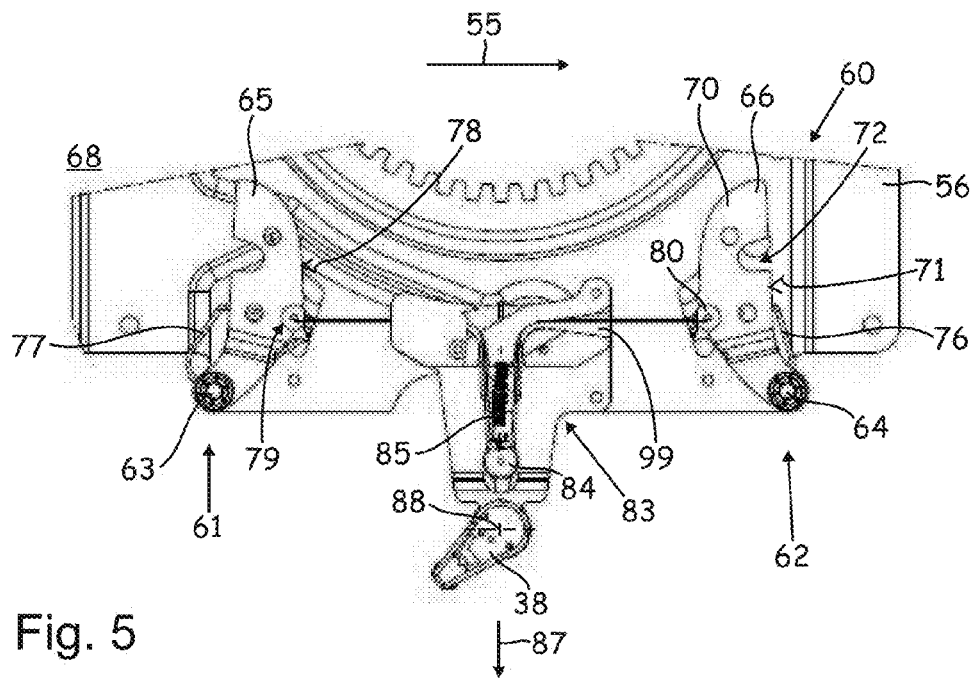
FIG. 5 shows a schematic detail of two locking elements of the present locking device.

The two vertical pivot axes 63 and 64 extend in parallel in a common vertical plane 67 (indicated merely by way of example in FIG. 4).

This vertical plane 67 extends perpendicularly to a horizontal plane 68, in which the two locking elements 65, 66 are pivotally arranged, this horizontal plane 68 coinciding with the plane of the paper in the illustration in FIGS. 4, 5, 10 and 11.

The term "horizontal plane" in the context of the present invention means that this plane extends over the width and length 55 of the vehicle and is only oriented horizontally when the commercial vehicle is on horizontally oriented ground. Otherwise this plane is inclined at the inclination of the entire commercial vehicle corresponding to the width and length of the vehicle. The same is true of the vertical plane 67.

In this arrangement, they are moved about the respective vertical pivot axes 62, 63 by a common resiliently deflectable operating element 69 which transmits only tensile operating forces, when the operating handle is accordingly manually deflected forwards (see FIGS. 1, 4, 5 and 10) or backwards (see FIGS. 2 and 11) in the horizontal plane 68.

In this respect the two locking elements 65 and 66 are arranged in an extremely compact manner so as to be synchronously operable in the horizontal plane 68 between the two transverse rail units 34 and 35 of the transverse oscillation device 21.

For this purpose the two locking elements 65 and 66 are each produced from main body plates 70 which are of planar construction and are approximately five millimeters thick or high (numbered only by way of example, see FIGS. 4 and 5), so they can easily find room between the two transverse rail units 34 and 35.

Figure 10:
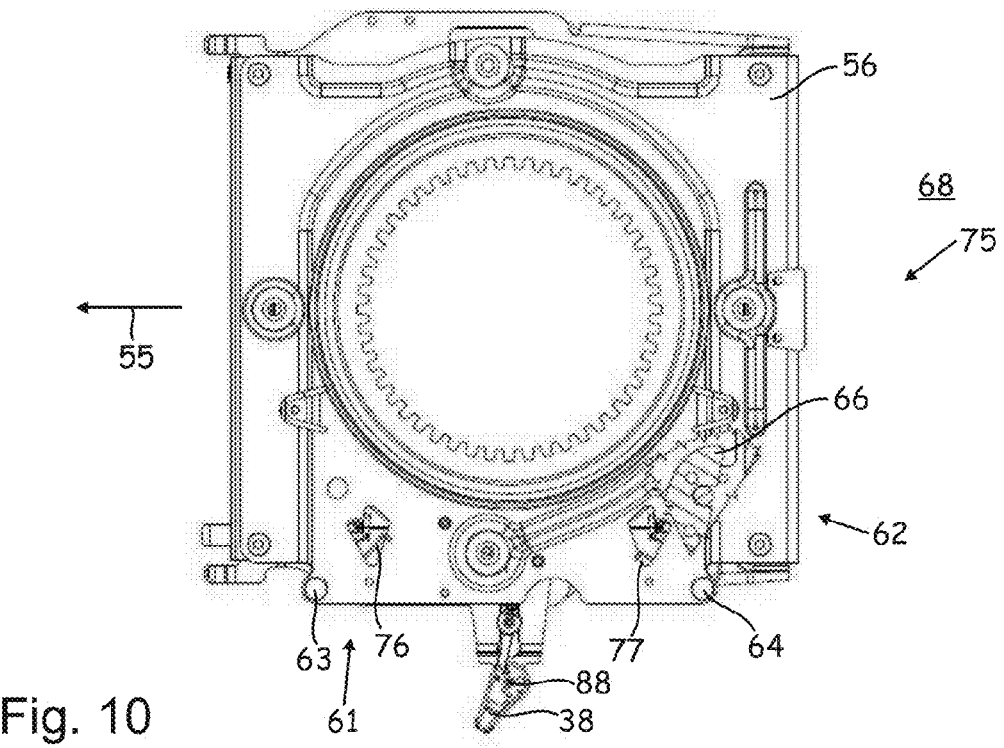
FIG. 10 is a fragmentary schematic view, from above, of the locked locking device.

In addition, the main body plates 70 of the two locking elements 65 and 66 have an arcuate configuration, a recess 72 being provided on a first long side 71 (numbered only by way of example, see FIG. 5) of the locking elements 65 and 66 and each of the locking elements 65 or 66 being caught on a corresponding locking bolt element 73 or 74 of the locking device 60 by means of the recess 72 when the locking device 60 and thus also the transverse oscillation device 21 is in a locking position 75 (see FIG. 10).

To enable the locking elements 65 and 66 to always catch reliably on the locking bolt element 73 and 74, each of the locking units 61 and 62 includes a torsion spring element 76 or 77.

While the respective recess 72 is worked in the respective first long side 71 of the locking elements 65, 66, mounts 79 for holding the operating element 69 are provided on a long side 78 remote from the first long side 71.

In this respect the second long side 78 can be described as a coupling side and the first long side 71 as a locking side of the respective locking elements 65 and 66.

A simple connection between the resiliently deflectable operating element 69 which transmits only tensile operating forces and the respective mount 79 of the locking element 65 or 66 is achieved in the present case in that the operating element 69 has a cylindrical barrel element 80 at each of its ends, which can be inserted in the corresponding mount 79.

In this embodiment the resiliently deflectable operating element 69 which transmits only tensile operating forces is embodied by a single Bowden cable element 81 in a constructionally advantageous manner.

In this arrangement, this Bowden cable element 81 is guided by means of a deflecting device 82 from the first of the locking elements 65 to the second of the locking elements 66 or vice versa.

The deflecting device 82 in this arrangement comprises only one guide link 83 and one deflecting element 84 of the operating handle 38, so it is advantageously simple in construction.

The deflecting element 84 in this arrangement is attached to the guide link part 83 by means of a helical spring 85, so the Bowden cable element 81 is always under tension and therefore biased owing to the operative connection between the helical spring 85 and the two torsion spring elements 76 and 77.

As a result, play-free operation of the operating handle 38 and of the entire locking device 60 is ensured, even when the locking device 60 is in the locking position 75.

The deflecting element 84 is fixed on a rod element 86 in this arrangement, the rod element 86 in turn being fastened eccentrically on the operating handle 38, so the rod element 86 can also be moved within the horizontal plane 68 and in or against the tensioning direction 87 (see FIG. 5 by way of example) when the operating handle 38 is accordingly rotated about a further vertical axis 88.

Figure 11:
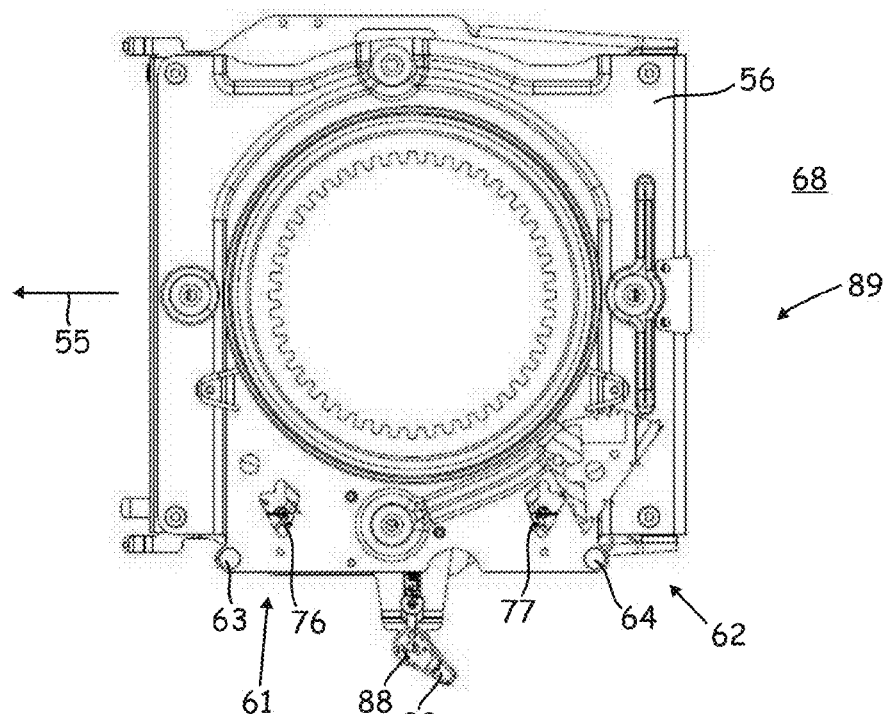
FIG. 11 is a fragmentary schematic view, from above, of the unlocked locking device.

As a result, the locking elements 65 and 66 can switch from the locking position 75 shown in FIG. 10 to the unlocking position 89 shown in FIG. 11, or the other way round with the aid of the torsion spring elements 76 and 77.

The guide link 83 shown in greater detail in FIG. 6 is characterised by two respective guideways 96 and 97 which are mutually opposed about a parting axis 95 and each comprise an entry region 98 or 99 facing the locking elements 65 and 66, the two entry regions 98 and 99 being directly opposite.

In addition the guide link 83 comprises two further guideways 100 and 101 of which the entry regions 102 and 103 directly oppose the deflecting element 84 of the operating handle 38.

The further entry regions 102 and 103 are rotated about 90° relative to the entry regions 98 and 99 in the horizontal plane 68, so the single Bowden cable element 81 is guided continuously and without interruption between the two locking elements 65, 66 and the operating handle 38 by means of two deflecting curves 104 and 105 and the additional deflecting element 84 along the course of the Bowden cable 106 shown in FIG. 7.

As shown clearly in particular in the illustration in FIG. 8, the locking elements 65, 66 are arranged on the cross slide part 56, between two transverse rail units 34 and 35 of the transverse oscillation device 21 in such a way that the height 107 thereof is arranged in a space 112 limited by a lower imaginary horizontal plane (not shown here) extending from the undersides 108 and 109 of the spaced-apart transverse rail units 34 and 35 and by an upper imaginary horizontal plane (also not shown here) extending from the upper sides 110 and 111 of the spaced-apart transverse rail units 34 and 35.

Depending on whether the commercial vehicle seat 1 is a driver's seat or a passenger's seat, the construction, in particular of the seat substructure 7, can also be symmetrical about the x axis, hence: the operating bracket 32 and in particular the manual grip element 31 and the manual operating handle 38 can be arranged on the right-hand side of the commercial vehicle seat rather than on the left-hand side of the commercial vehicle seat.

It will be appreciated that the above-described embodiment is merely a first configuration of the commercial vehicle seat according to the invention. In this respect the configuration of the invention is not limited to this embodiment.

Any features disclosed in the application documents are claimed as essential to the invention insofar as they are novel over the prior art, individually or in combination.

LIST OF REFERENCE NUMERALS 1 commercial vehicle seat
2 seat part
3 backrest part
4 headrest part
5 forwards direction of travel
6 armrest part
7 seat substructure
8 body part
9 horizontal movement part
10 vertical movement part
11 lengthwise adjustment directions
12 transverse oscillation directions
13 rotational adjustment directions
14 vertical axis
15 vertical adjustment directions
16 scissor-action frame
17 upper plate
18 floor plate
19 spring damper device
20 lengthwise adjustment device
21 transverse oscillation device
22 rotational adjustment device
25 right-hand lengthwise rail unit
26 left-hand lengthwise rail unit
27 guide rail element
28 glide rail element
30 double catch unit
31 grip element
32 operating bracket
33 base carrier part
34 front transverse rail unit
35 back transverse rail unit
36 guide rail transverse element
37 glide rail transverse element
38 manual operating handle
45 lower shell part
45A shell fixed part
46 upper shell part
46A shell rotational part
47 rolling bearing unit
49 cover element
50 screw nuts
51 threaded bolt
52 first ball-and-cage part
53 second ball-and-cage part
55 length of commercial vehicle
56 cross slide part
57 damper
60 locking device
61 first locking unit
62 second locking unit
63 first vertical pivot axis
64 second vertical pivot axis
65 first locking element
66 second locking element
67 vertical plane
68 horizontal plane
69 operating element
70 main body plates
71 first long side
72 recess
73 first locking bolt element
74 second locking bolt element
75 locking position
76 first torsion spring element
77 second torsion spring element
78 second long side
79 mounts
80 cylindrical barrel element
81 Bowden cable element
82 deflecting device
83 guide link
84 deflecting element
85 helical spring
86 rod element
87 tensioning directions
88 further vertical axis
89 unlocking position
95 parting axis
96 first guideway
97 second guideway
98 first entry region
99 second entry region
100 further first guideway
101 further second guideway
102 further first entry region
103 further second entry region
104 first deflecting curve
105 second deflecting curve
106 course of Bowden cable
107 height
108 underside of front transverse rail unit
109 underside of back transverse rail unit
110 upper side of front transverse rail unit
111 upper side of back transverse rail unit
112 space

What is claimed is:

1. A commercial vehicle seat, comprising:
a seat part;
a backrest part; and
a seat substructure for arrangement on a body part of a commercial vehicle, wherein the seat substructure includes a base carrier part and a transverse oscillation device, the transverse oscillation device comprising:
a cross slide part which is capable of oscillating transversely to a length of the commercial vehicle;
a means by which at least the seat part is mounted so the seat part is capable of oscillating transversely to a direction of travel on the base carrier part of the seat substructure; and
a locking device for fixing the cross slide part on the base carrier part, wherein the locking device comprises two locking units which are spaced apart along the length of the commercial vehicle and have respective locking elements which are mounted pivotally about vertical pivot axes, wherein the locking units are arranged so as to be synchronously operable in a horizontal plane between two transverse rail units of the transverse oscillation device, and wherein the locking elements, a resiliently deflectable operating element which are operatively connected to the locking elements, and deflecting elements of a deflecting device are arranged in a common horizontal plane.

2. The commercial vehicle seat according to claim 1, wherein each of the locking elements is coupled to the cross slide part by means of a resiliently deflectable operating element which transmits only tensile operating forces.

3. The commercial vehicle seat according to claim 1, wherein the two locking elements are operatively interconnected by a single continuous Bowden cable element which is deflected around a deflecting element of a manual operating handle.

4. The commercial vehicle seat according to claim 1, wherein a manual operating handle is arranged in the common horizontal plane with the locking elements, the resiliently deflectable operating element, and the deflecting elements of the deflecting device.

5. The commercial vehicle seat according to claim 1, wherein the locking elements are arranged on the cross slide part, between two transverse rail units of the transverse oscillation device, in such a way that the height thereof is arranged in a space limited by a lower imaginary horizontal plane extending from the undersides of the spaced-apart transverse rail units and by an upper imaginary horizontal plane extending from the upper sides of the spaced-apart transverse rail units.

6. The commercial vehicle seat according to claim 1, wherein a resiliently deflectable operating element which transmits only tensile operating forces is spring-biased, in particular this operating element which transmits only tensile operating forces being biased by a spring-biased deflecting element of a manual operating handle.

7. The commercial vehicle seat according to claim 1, wherein the vertical pivot axes of the two locking elements are arranged together in a vertical plane extending in the lengthwise direction of the vehicle.

8. The commercial vehicle seat according to claim 1, wherein each of the locking elements is spring-biased on the cross slide part so as to act in the direction of a locking position.

9. The commercial vehicle seat according to claim 1, wherein the locking elements each have a planar main body on which is provided a recess for engaging on a locking bolt element of the locking device, the recess being arranged on a long side of the main body which is remote from a coupled side of the main body, defined by the operating element.

10. The commercial vehicle seat according to claim 1, wherein each of the locking units is allocated a locking bolt element which is arranged on the base carrier part.

11. A commercial vehicle seat comprising:
a seat part;
a backrest part; and
a seat substructure for arrangement on a body part of a commercial vehicle, wherein the seat substructure includes a transverse oscillation device, the oscillation device comprising: a cross slide part which is capable of oscillating transversely along a length of the commercial vehicle; a means by which at least the seat part is mounted so the seat part is capable of oscillating transversely to a direction of travel on a base carrier part of the seat substructure; and a locking device for fixing the cross slide part on the base carrier part, wherein the locking device comprises two locking units which are spaced apart along the length of the commercial vehicle and have respective locking elements which are mounted displaceably along linear axes, wherein the locking units are arranged so as to be synchronously operable in a horizontal plane between two transverse rail units of the transverse oscillation device.

* * * * *